United States Patent
Yamaguchi et al.

[11] Patent Number: 5,366,413
[45] Date of Patent: Nov. 22, 1994

[54] ELASTIC UNIVERSAL COUPLING

[75] Inventors: Mikio Yamaguchi; Hiroshi Sekine, both of Takasaki, Japan

[73] Assignee: NSK Ltd., Tokyo, Japan

[21] Appl. No.: 26,197

[22] Filed: Feb. 26, 1993

Related U.S. Application Data

[63] Continuation of Ser. No. 741,562, Aug. 7, 1991, abandoned.

[30] Foreign Application Priority Data

Aug. 13, 1990 [JP] Japan .................. 2-84536[U]

[51] Int. Cl.$^5$ ............... B62D 1/16; F16D 3/76
[52] U.S. Cl. ................. 464/89; 74/492; 464/160
[58] Field of Search ............ 464/89, 32, 91, 113, 464/122, 134, 182, 905; 74/492; 403/290; 280/277, 278

[56] References Cited

U.S. PATENT DOCUMENTS

| | | | |
|---|---|---|---|
| 2,032,900 | 3/1936 | Alger | 464/89 X |
| 2,262,512 | 11/1941 | Musselman | 464/89 |
| 2,727,368 | 12/1955 | Morton | 464/89 |
| 3,541,810 | 11/1970 | Kendall | 464/89 |
| 3,878,695 | 4/1975 | Pitner | 464/89 |
| 4,098,141 | 7/1978 | Yamaguchi | 74/492 |
| 4,183,258 | 1/1980 | Stephan | 464/89 X |
| 4,385,897 | 5/1983 | Mallet | 464/89 |
| 4,983,143 | 1/1991 | Sekine et al. | 464/89 |

FOREIGN PATENT DOCUMENTS 63-69077 5/1988 Japan.

Primary Examiner—Daniel P. Stodola
Assistant Examiner—Eileen A. Dunn
Attorney, Agent, or Firm—Shapiro and Shapiro

[57] ABSTRACT

An elastic universal coupling is constructed with the inner peripheral portion of a housing member provided at the end of a shaft and the outer peripheral portion of a yoke mounted to a cross shaft, with the housing yoke connected with each other through an elastic member. Further, through-holes for receiving a pin projecting from the outer peripheral of the yoke are provided at the housing member, and the inside diameter of the through-holes is larger than the outside diameter of the pin.

6 Claims, 3 Drawing Sheets

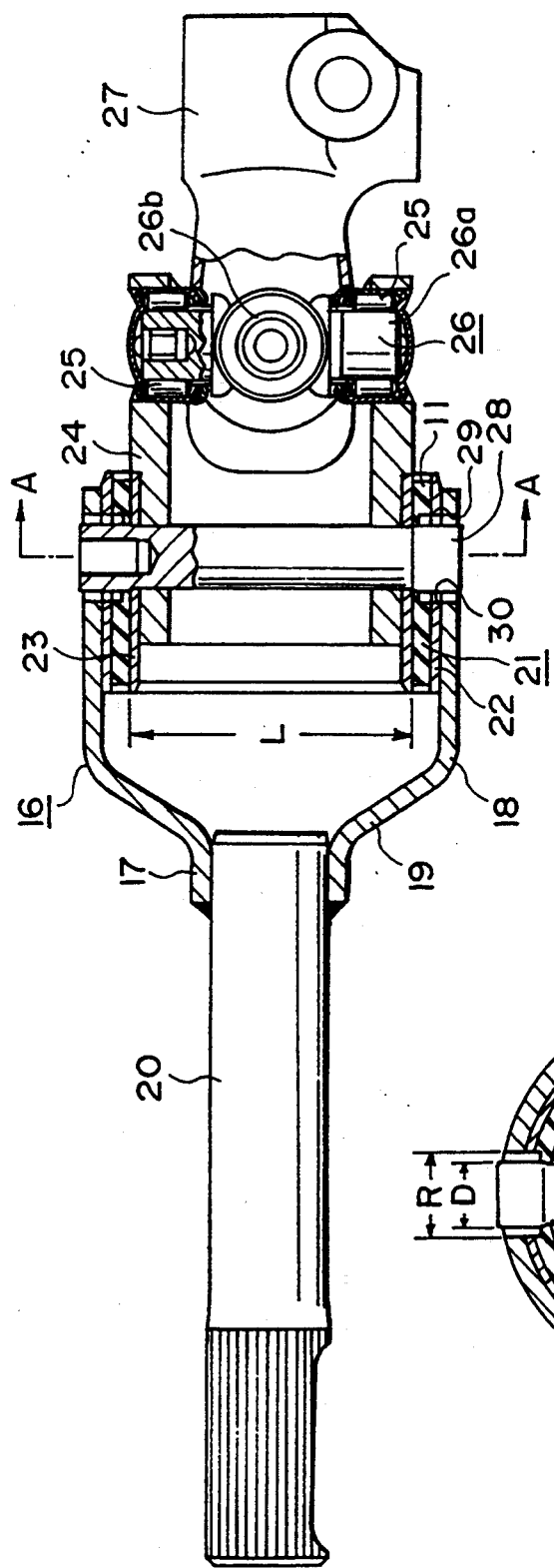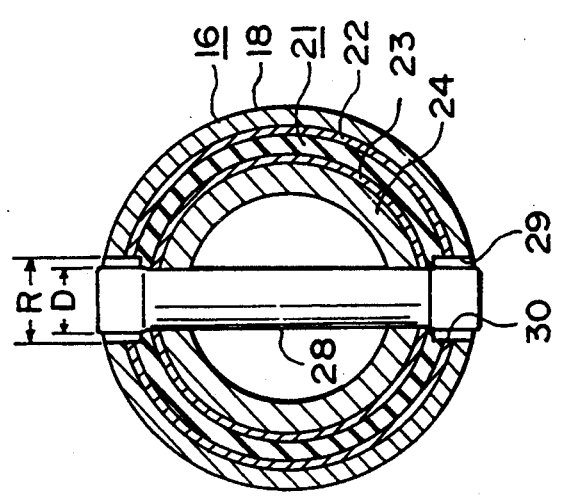

ELASTIC UNIVERSAL COUPLING

This is a continuation of application Ser. No. 741,562 filed Aug. 7, 1991, now abandoned.

BACKGROUND OF THE INVENTION

1. Field of the Invention

An elastic universal coupling according to this invention is installed to, for example, an automotive steering apparatus to transmit the movement of the steering shaft to the steering gear.

2. Related Background Art

The automotive steering apparatus is constructed, for example, as shown in FIG. 5.

The movement of a steering wheel 1 is transmitted to a steering gear 4 through a steering shaft 2 and a connecting rod 3, and this steering gear 4 steers the wheels.

The steering shaft 2 and an input shaft 5 for the steering gear 4 are usually not coaxial with each other. For this reason, the connecting rod 3 has been conventionally provided between the steering shaft 2 and the input shaft 5, and both ends of the connecting rod 3 are connected with the end of the steering shaft 2 and that of the input shaft 5 through universal couplings 6, 6 respectively in order to transmit torque between the steering shaft 2 and the input shaft 5.

The universal coupling 6, which is installed in such a power transmission mechanism, etc., is provided with a vibration-proof mechanism so as not to so as transmit vibration of the wheels to the steering wheel 1.

As examples of an elastic universal coupling with the vibration-proof mechanism, those as specified in Japanese Utility Model Application Laid-Open No. 63-69077 and U.S. Pat. No. 4,983,143 are known, and the former is shown in FIG. 6.

In FIG. 6, a yoke 7 is bifurcated by press molding metallic plate having sufficient rigidity, and a pair of circular holes 8, 8, which are coaxial with each other, are provided at the tip ends (right ends in FIG. 6) of the yoke 7. A second yoke (not shown in FIG. 6) is coupled to the yoke 7 by a cross shaft (not shown in FIG. 6) which is pivotally connected to the yoke 7 at holes 8, 8 and also to the second yoke. It is thus possible to freely transmit a rotating force between the second yoke (not shown) and the yoke 7.

A shaft 9 has one end secured by welding to the base (left) end of the yoke 7, and a second end having a serrated portion. An inner cylinder 13, which forms an elastic member 12 together with an outer cylinder 10 and an elastic body 11, is fitted to the serrated portion. The outer cylinder 10 is cylinder 14 which will be crushed if a strong force in the axial direction is applied, and another shaft 15 is secured to the other end of the combined cylinder 14.

In the elastic universal coupling described in the above-mentioned Japanese Utility Model Application Laid-Open No. 63-69077, even if vibration travels from the wheels to the shaft 15, this vibration will be absorbed by the elastic body 11 of the elastic member 12 owing to the above-mentioned construction. Therefore, the vibration will not travel to the shaft 9 connecting with the steering wheel 1. If the shaft 9 is strongly pushed due to a collision, the combined cylinder 14 will be crushed to prevent the steering wheel 1 connecting with the shaft 9 from being thrust up.

However, in the case of a conventional elastic universal coupling constructed as mentioned above, the length in the axial direction has to be long because the yoke 7 is connected with the elastic member 12 through the shaft 9.

For this reason, if the length of a portion for installing the elastic universal coupling cannot be made sufficiently long, the conventional coupling cannot be used.

Also since the diameter of the elastic body 11 to be fitted to the outside of the shaft 9 through the inner cylinder 13 is small, the torsional rigidity of the elastic body 11 is not always adequate, thus creating problems with controllability and stability.

To improve the controllability and stability, it is possible to increase the rigidity of the elastic body 11. However, when the hardness of the elastic body (rubber) 11 is increased for this purpose, the vibration damping performance becomes insufficient. To make the elastic body 11 comparatively soft and yet increase the rigidity thereof, it is conceivable to make the diameter of the elastic body 11 large. But, in the case of the above-mentioned conventional construction, the diameter of the elastic body 11 could not be made sufficiently large to provide adequate controllability, stability, and vibration damping performance.

In this respect, the invention specified in the above-mentioned U.S. Pat. No. 4,983,143 has also the same problem.

SUMMARY OF THE INVENTION

It is an object of the present invention to provide an elastic universal coupling for a steering apparatus in which good controllability and stability, and good vibration damping performance are achieved, with a compact construction.

An elastic universal coupling according to the present invention may comprise a first yoke having a bifurcated first end and a cylindrical second end; a second yoke having a bifurcated end coupled to said first end of said first yoke through a cross shaft having respective shaft portions pivotally connected to said first end of said first yoke and said end of said second yoke; a housing member having a first end connected to a shaft means, and a second end of internal diameter greater than an outer diameter of said second end of said first yoke and in which said second end of said first yoke is received, said second end of said housing member being formed with a pair of coaxially aligned through-holes; an elastic member elastically coupling said second end of said first yoke to said second end of said housing member, said elastic member including an outer cylinder securely fitted to an inner peripheral surface of said second end of said housing member, an inner cylinder securely fitted to anouter peripheral surface of said second end of said first yoke, and an elastic body disposed between and secured to said outer cylinder and said inner cylinder, said outer cylinder having a pair of through-holes aligned with said through-holes of said housing member; and a pin inserted through said housing member, said elastic member, and said second end of said first yoke, and having opposite ends projecting from said first yoke and each received, with clearance, in a corresponding said through-hole of said housing member and a corresponding said through-hole of said outer cylinder of said elastic member.

In the case of an elastic universal coupling according to the present invention as mentioned above, the length in the axial direction can be reduced and yet the diameter of the elastic body constituting the elastic member can be made large because the elastic member has been provided between the outer peripheral surface of the first yoke formed in a cylindrical form and the inner peripheral surface of the housing.

Therefore, enough rigidity can be secured, and the controllability and stability, and the vibration damping performance can be reconciled even if the hardness of the elastic body is decreased.

BRIEF DESCRIPTION OF THE DRAWINGS

FIGS. 1 to 3 show a first embodiment according to the present invention, FIG. 1 is a sectional view; FIG. 2 is a sectional view taken on line A—A in FIG. 1; and FIG. 3 is a sectional view showing a state of deformation of the housing member due to a collision accident;

DESCRIPTION OF THE PREFERRED EMBODIMENTS

Figure 3:
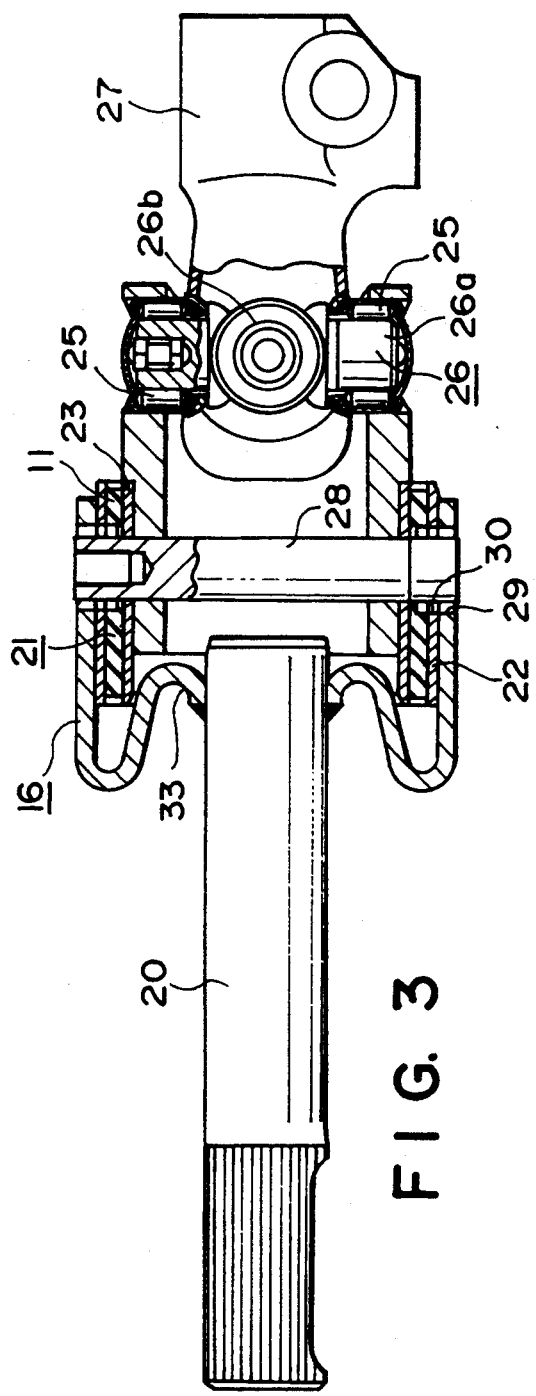

The present invention will hereinafter be described with respect to embodiments thereof shown in the drawings.

Referring to FIGS. 1-3, a housing member 16 formed by drawing metallic tube is comprised of a small diameter portion 17 and a large diameter portion 18 which are connected by a deformable frusto-conical intermediate portion having a steep inclined surface 19. One end of a shaft 20 is internally fitted to the small diameter portion 17, and is further fixed by welding. Inside the large diameter portion 18, an elastic member 21 is internally fitted for fixing.

The elastic member 21 comprises an elastic body 11 such as rubber secured by baking or applying adhesive between the inner peripheral surface of an outer cylinder 22 and the outer peripheral surface of an inner cylinder 23 which have been made of metallic tube respectively. The outer cylinder 22 is secured to the inside of the housing member 16 by securing the outer cylinder 22 by inside fitting to the large diameter portion 18 of the housing member 16.

A first yoke 24 is secured to the inside of the inner cylinder 23 by internally fitting one end (the left end half in FIG. 1) to the inner cylinder 23. Also a bifurcated portion is formed in the other end of the first yoke 24, and one shaft 26a of a cross shaft 26 is pivotally supported by a pair of bearings 25, 25 which are supported by the bifurcated portion. A second yoke 27 is pivotally supported by a shaft 26b of the cross shaft 26 similarly through bearings.

Further, at the one end of the first yoke 24, a pin 28 is secured so that it penetrates the one end in the diameter direction and its ends project from the outer peripheral surface of the one end. Through-holes 29 and 30 are formed respectively in the housing member 16 and the outer cylinder 22 and accommodate the projecting ends of pin 28.

The inside diameter R of each of the through-holes 29 and 30 is made slightly larger than the outside diameter D of the projection of the pin 28 (R>D), and clearances are allowed to exist between the outer peripheral surface of the projection and the inner peripheral edge of each through-hole 29, 30.

Figure 5:
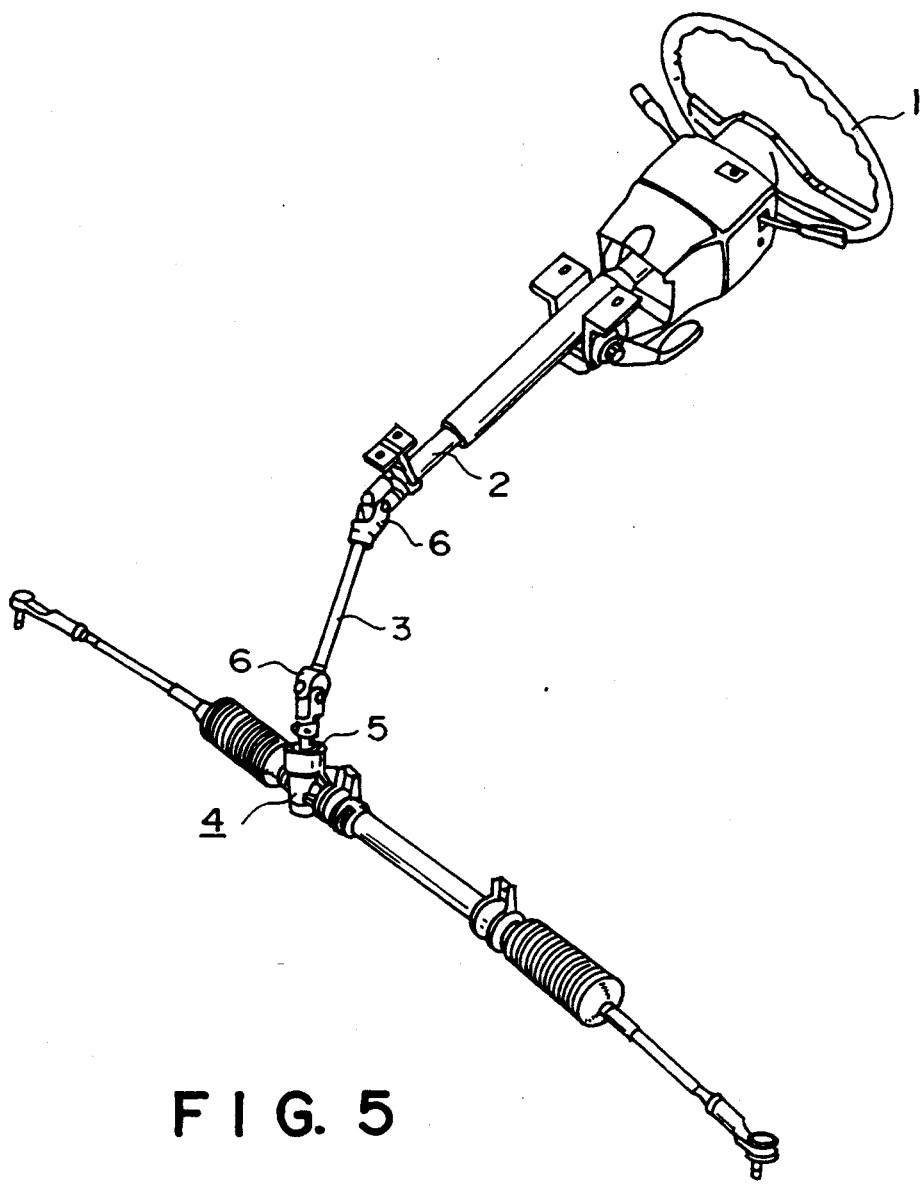
FIG. 5 is a perspective view of a steering apparatus with a universal coupling installed.

In the elastic universal coupling according to the present invention as mentioned above, vibration, which travels from the wheels to the housing member 16 through the shaft 20, is damped by the elastic body 11 constituting the elastic member 21 and does not travel to the first yoke 24. Accordingly travel of vibration of the wheels to the steering wheel 1 (FIG. 5) connected through the second yoke 27 and the steering shaft 2 (FIG. 5) is prevented.

A torque is transmitted between the first yoke 24 and the housing member 16 through the elastic member 21. When the transmitted torque becomes great, the outer peripheral surface of the projection of the pin 28 abuts on the inner peripheral edge of the through-holes 29 and 30 to prevent an excessive force from being applied to the elastic body 11, thus preventing damage to the elastic body.

In the elastic universal coupling according to the present invention, the length of the elastic universal coupling in the axial direction (the left-to-right direction in FIG. 1) can be reduced and yet the diameter L of the elastic body 11 can be made large because a part of the first yoke 24 formed in a cylindrical form is overlapped with a part of the housing member 16 likewise formed in a cylindrical form, and because the elastic member 21 is provided between the outer peripheral surface of the first yoke 24 and the inner peripheral surface of the housing member 16.

Since the diameter L of the elastic body 11 can be made long, enough rigidity can be secured, and good controllability and stability, damping can be achieved even if the hardness of the elastic body 11 is decreased to improve the vibration damping performance.

When the shaft 20 is strongly pushed due to a collision, the steep inclined portion 19. The deformable member formed in the middle of the housing member 16, is crushed (FIG. 3) so that the direction of inclination is reversed to prevent the steering wheel 1 (FIG. 5) connected with the shaft 2 from being thrust up.

Figure 4:
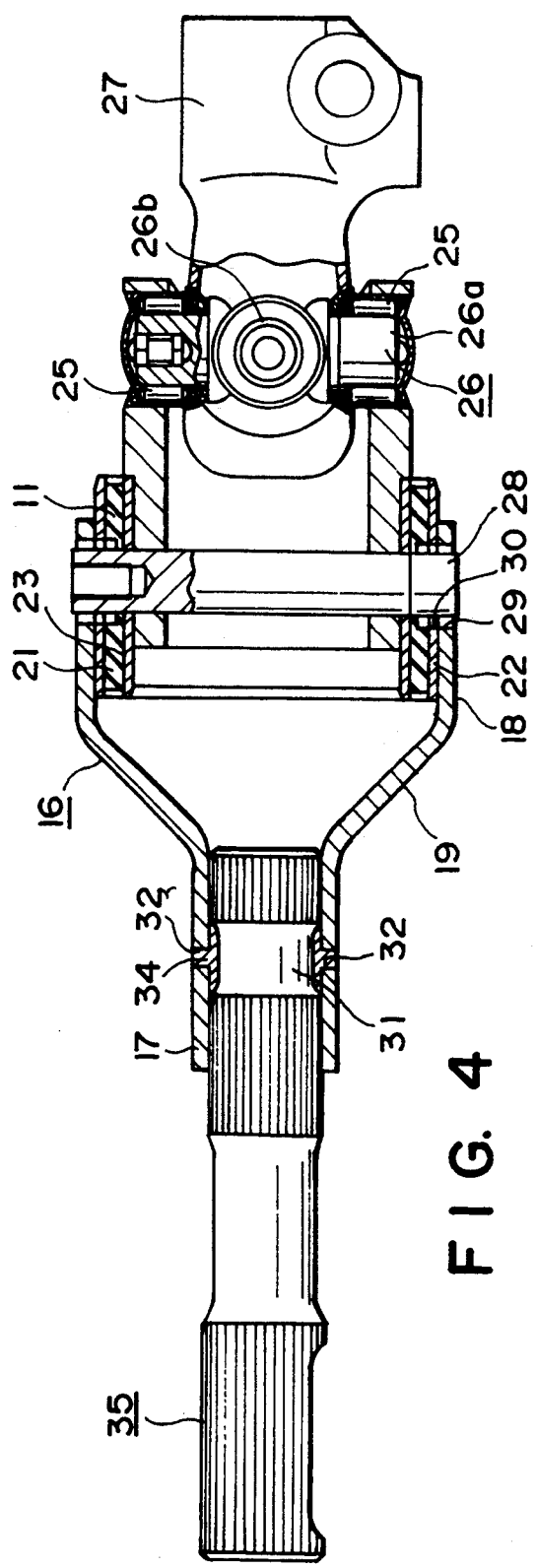
FIG. 4 is a sectional view showing a second embodiment of the present invention.

FIG. 4 shows a second embodiment according to the present invention.

In the case of this embodiment, one end of a shaft 35 is serration engaged with one end of the housing member 16. Similarly to the first embodiment, the housing 16 has small and large diameter ends 17 and 18 connected by a frusto-conical intermediate portion having a steep inclined surface 19. However, in the present embodiment the shaft 35 and the housing member 16 are axially connected with each other by filling, with synthetic resin 34, a concave portion 31 formed on the outer peripheral surface of the end of the shaft 35 over the entire periphery and through-holes 32, 32 formed in a portion of the housing member overlying the concave portion 31. When a strong force in the axial direction is applied due to a collision, the synthetic resin 34 splits between the shaft 35 and the housing member 16 to allow the shaft 35 and the housing member 16, which have been serration connected with each other, to be freely displaced.

Figure 6:
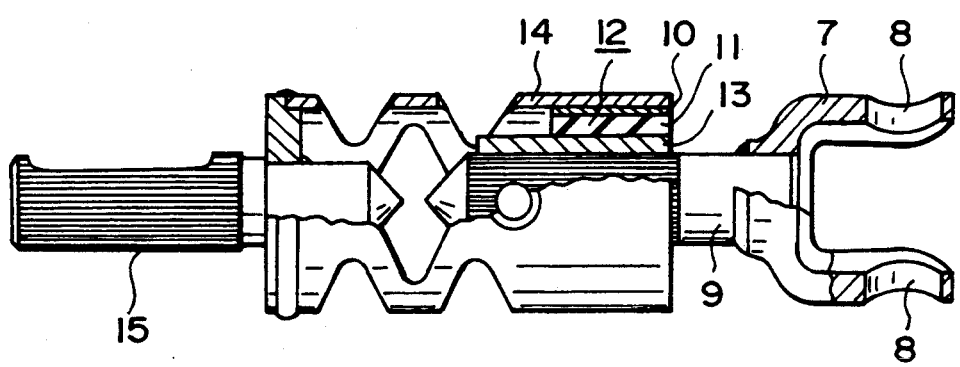
FIG. 6 is a partially sectional view showing an example of a conventional elastic universal coupling.

It will be appreciated, of course, that the foregoing embodiments of the invention are merely illustrative and that various changes and modifications are possible in keeping with the principles of the invention. For example, a bellows-shaped deformable portion may be provided in a part of the housing member 16 or a mesh-like portion may be provided in a part of the housing member 16 (as shown in FIG. 6) as a shape which can be easily crushed in the axial direction to prevent the steering wheel from being thrust up during a collision. Also, the end of the housing member 16 may be formed by drawing in a circular pipe form, and this drawn portion may be used in place of the shaft 20.

Since, the elastic universal coupling according to the present invention is constructed and operates as mentioned above, the length can be reduced to enable mounting in a shorter space, while still providing good control-lability and stability and good vibration damping performance.

We claim:

1. An elastic universal coupling comprising:
   a first yoke constituted by a cylindrical sleeve having a first end formed with a bifurcated portion and a second end;
   a second yoke having a bifurcated end coupled to said first end of said first yoke through a cross shaft having respective shaft portions pivotally connected to said first end of said first yoke and said bifurcated end of said second yoke;
   a one-piece housing having a substantially frusto-conical intermediate portion from opposite axial ends of which extend, respectively, a first end portion fitted to a surface of a shaft and a second end portion of greater internal diameter and in which said second end of said first yoke is received, said second end portion of said housing being formed with a pair of coaxially aligned through-holes; an elastic member elastically coupling said second end of said first yoke to said second end portion of said housing and having an inner diameter which is greater than that of said bifurcated portion of said first yoke, said elastic member including an outer cylinder securely fitted to an inner peripheral surface of said second end portion of said housing, an inner cylinder securely fitted to an outer peripheral surface of said second end of said first yoke, and an elastic body disposed between and secured to said outer cylinder and said inner cylinder, said outer cylinder having a pair of through-holes aligned with said through-holes of said housing; and
   a pin inserted through said housing, said elastic member, and said second end of said first yoke, and having opposite ends projecting from said first yoke and each received, with clearance, in a corresponding said through-hole of said housing and a corresponding said through-hole of said outer cylinder of said elastic member.

2. An elastic universal coupling according to claim 1, wherein said shaft is serration-engaged with said first end portion of said housing and axially fixed relative to said first end portion of said housing by synthetic resin filled in a concave outer peripheral portion of said shaft and in at least one over-lying through-hole formed in said first end of said housing, said resin being rupturable by a strong axial force to permit axial displacement of said shaft relative to said first end portion of said housing.

3. An elastic universal coupling according to claim 1, wherein said intermediate portion of said housing is deformable in response to a strong axial force so as to permit axial displacement of said shaft relative to said housing.

4. An elastic universal coupling comprising:
   a first yoke having a bifurcated first end and a cylindrical second end;
   a second yoke having a bifurcated end coupled to said bifurcated first end of said first yoke through a cross shaft having respective shaft portions pivotally connected to said bifurcated first end of said first yoke and said bifurcated end of said second yoke;
   a one-piece housing having a first end of a first internal diameter connected to a surface of a shaft, a second end of greater internal diameter and in which said second end of said first yoke is received, and an intermediate portion joining said first and second ends of said housing and progressively decreasing in diameter along an axial direction of said housing from said second toward said first end of said housing, said second end of said housing being formed with a pair of coaxially aligned through-holes;
   an elastic member elastically coupling said second end of said first yoke to said second end of said housing and having an inner diameter which is greater than that of said bifurcated first end of said first yoke, said elastic member including an outer cylinder securely fitted to an inner peripheral surface of said second end of said housing, an inner cylinder securely fitted to an outer peripheral surface of said second end of said first yoke, and an elastic body disposed between and secured to said outer cylinder and said inner cylinder, said outer cylinder having a pair of through-holes aligned with said through-holes of said housing; and
   a pin inserted through said housing, said elastic member, and said second end of said first yoke, and having opposite ends projecting from said first yoke and each received, with clearance, in a corresponding said through-hole of said housing and a corresponding said through-hole of said outer cylinder of said elastic member.

5. An elastic universal coupling according to claim 4, wherein said shaft is serration-engaged with said first end of said housing and axially fixed relative to said first end of said housing by synthetic resin filled in a concave outer peripheral portion of said shaft and in at least one overlying through-hole formed in said first end of said housing, said resin being rupturable by a strong axial force to permit axial displacement of said shaft relative to said first end of said housin.

6. An elastic universal coupling according to claim 4, wherein said intermediate portion of said housing is deformable in response to a strong axial force so as to permit axial displacement of said shaft relative to said housing.

* * * * *